(12) United States Patent
Branyon et al.

(10) Patent No.: US 8,683,678 B2
(45) Date of Patent: Apr. 1, 2014

(54) PURGE APPARATUS FOR MANUFACTURING TUBE AND FIN HEAT EXCHANGER

(75) Inventors: James Branyon, Evansville, TN (US); Rodney Catlett, Pikeville, TN (US); Sean Mosser, Spring, TX (US); Lawrence Walker, Crossville, TN (US); Ronald Wenger, Dayton, TN (US)

(73) Assignee: Goodman Global, Inc., Houston, TX (US)

( * ) Notice: Subject to any disclaimer, the term of this patent is extended or adjusted under 35 U.S.C. 154(b) by 197 days.

(21) Appl. No.: 13/297,670

(22) Filed: Nov. 16, 2011

(65) Prior Publication Data

US 2012/0055014 A1 Mar. 8, 2012

Related U.S. Application Data

(63) Continuation of application No. 12/359,099, filed on Jan. 23, 2009, now Pat. No. 8,074,356.

(51) Int. Cl.
*B23P 15/26* (2006.01)
*B08B 9/00* (2006.01)

(52) U.S. Cl.
USPC ............... 29/726.5; 29/726; 29/650; 29/33 T; 29/890.03; 165/95; 134/166 C; 134/166 R; 134/169 C

(58) Field of Classification Search
USPC ............. 29/726, 726.5, 727, 650, 33 K, 33 R, 29/33 G, 33 T, 890.03, 890.039, 890.04, 29/890.043–890.046, 890.053, 890.054; 165/95, 177, 178, 179, 181, 182; 134/109, 111, 166 C, 169 R, 169 A, 134/169 C, 166 R
See application file for complete search history.

(56) References Cited

U.S. PATENT DOCUMENTS

| | | |
|---|---|---|
| 3,979,042 A | 9/1976 | Peters |
| 4,044,423 A | 8/1977 | Gaiardelli |
| 4,063,317 A | 12/1977 | Santore |
| 4,137,928 A | 2/1979 | Sentell |
| 4,225,362 A | 9/1980 | Sentell |
| 4,526,112 A | 7/1985 | Warner |
| 4,577,380 A | 3/1986 | Warner |
| 4,645,119 A | 2/1987 | Haramaki et al. |
| 4,669,530 A | 6/1987 | Warner |
| 4,724,007 A | 2/1988 | Barry et al. |
| 4,730,667 A | 3/1988 | Chevion |
| 4,731,100 A | 3/1988 | Loeffelmann et al. |
| 4,772,346 A | 9/1988 | Anderson et al. |
| 4,776,391 A | 10/1988 | Warner |
| 4,785,516 A | 11/1988 | Gilbertson |
| 5,074,338 A | 12/1991 | Weber |
| 5,210,932 A * | 5/1993 | Tokura .......................... 29/727 |
| 5,315,966 A | 5/1994 | Gamache et al. |
| 5,341,978 A | 8/1994 | Halstead et al. |

(Continued)

*Primary Examiner* — Sarang Afzali
(74) *Attorney, Agent, or Firm* — Andrews Kurth LLP

(57) ABSTRACT

According to the preferred embodiment, an improved method and apparatus for the manufacturing of an aluminum tube and aluminum fin heat exchanger that includes steps for pneumatic cleaning, thermal cleaning, and uncontrolled-atmosphere open-flame autobrazing of hairpins to return bend fittings. The method uses a tube lubrication system that is adjustable to control amount of lubrication applied to the tube prior to final expansion. The method uses a pneumatic coil cleaning station that is adjusted to reduce the residual oil particulate from the expansion process required to be thermally cleaned.

12 Claims, 12 Drawing Sheets

(56) References Cited

U.S. PATENT DOCUMENTS

| | | | |
|---|---|---|---|
| 5,437,073 A | 8/1995 | Smith | |
| 5,442,826 A | 8/1995 | Murata et al. | |
| 5,499,639 A * | 3/1996 | Williams, Jr. | 134/7 |
| 5,771,962 A | 6/1998 | Evans et al. | |
| 5,983,994 A | 11/1999 | Tsou | |
| 6,001,779 A | 12/1999 | Yamaguchi | |
| 6,158,074 A | 12/2000 | Castille | |
| 6,176,006 B1 | 1/2001 | Milliman et al. | |
| 6,397,923 B1 | 6/2002 | Peting et al. | |
| 6,512,205 B1 | 1/2003 | Evans | |
| 6,553,601 B1 | 4/2003 | Major | |
| 6,681,839 B1 | 1/2004 | Balzer | |
| 6,800,025 B2 | 10/2004 | Pope et al. | |
| 6,936,112 B2 | 8/2005 | Jansen et al. | |
| 6,968,761 B2 | 11/2005 | Frank | |
| 6,978,793 B1 * | 12/2005 | Krueger | 134/169 R |
| 7,178,534 B2 | 2/2007 | Garman et al. | |
| 7,464,670 B2 | 12/2008 | Hermamdez et al. | |

* cited by examiner

PURGE APPARATUS FOR MANUFACTURING TUBE AND FIN HEAT EXCHANGER

CROSS REFERENCE TO RELATED APPLICATION

This application is a continuation of U.S. patent application Ser. No. 12/359,099 filed on Jan. 23, 2009, now U.S. Pat. No. 8,074,356, the priority of which is claimed.

BACKGROUND OF THE INVENTION

1. Field of the Invention

This invention relates generally to tube and fin heat exchangers, and in particular, to manufacturing processes and equipment for producing tube and fin heat exchangers made with aluminum tubing, such as for HVAC systems.

2. Description of the Prior Art

As illustrated in FIG. 1, a typical tube and fin heat exchanger (10) consists of a stack of generally planar aluminum fins (12) sandwiched between a top end plate (14) and a bottom end plate (16). The terms "top" and "bottom" used for designating heat exchanger end plates are derived based on the heat exchanger orientation during expansion in a vertical hairpin expander press, as described below. The "top" and "bottom" designations are not necessarily indicative of the heat exchanger orientation in any particular installation.

The fins (12) have a number of collared holes (18) formed therethrough, and the top and bottom end plates (14, 16) have corresponding holes (20) formed therethrough. When the fins (12) and end plates (14, 16) are stacked, the holes (18, 20) are in axial alignment for receiving a number of U-shaped hairpin tubes ("hairpins") (22) through the stack. Hairpins (22) are formed by bending lengths of small tubes 180 degrees around a small diameter mandrel. The hairpin tubes (22) are fed, or laced, through the loosely-stacked assembly of fins from the bottom end plate (16) so that the open ends (26) of the hairpin tubes (22) extend beyond the top end plate (14). The top end plate (14) is slipped over the open ends (26) of the hairpins (22), and the hairpins (22) are either brazed to the fins, or are mechanically expanded from within using a hairpin expander to create a mechanical interference fit with the fins (12). U.S. Pat. No. 4,645,119 issued to Haranaki, et al. describes a process in which hairpins (22) are brazed to the fins (12). Co-pending U.S. patent application Ser. No. 12/139,379 filed on Jun. 13, 2008 in the name of Dees, et al., describes a typical manufacturing process for making heat exchangers with aluminum fins and copper hairpin tubing in which the hairpins are expanded into interference engagement with the fins. The distance that the hairpin ends (26) extend beyond the top end plate (14) is referred to as the hairpin "stickup" distance. The stickup distance is typically about ½ inch. Finally, return bend fittings (24) are brazed to the open ends (26) of the hairpin tubes (22) to create a serpentine fluid circuit through the stack of fins (12).

Heat exchangers can be made of various metals. The most prevalent materials used are aluminum for fins (12) and copper for hairpin tubes (22). However, due to corrosion concerns and also in part due to the rising price of copper, there is desire among HVAC manufacturers to transition a greater number of production lines for the exclusive manufacture of tube and fin heat exchangers with both aluminum fins and aluminum tubing.

FIG. 2 is a flow chart diagram that describes a typical manufacturing process of prior art used to mass produce aluminum tube and fin heat exchangers using the hairpin expansion process. Referring to both FIGS. 1 and 2, as shown in step (50), fins (12) are formed by a stamping process in a fin press, such as that produced by Burr Oak Tool, Inc. of Sturgis, Mich. Aluminum fin stock is delivered to a press in a roll of sheet metal. Fin stock is paid out from an uncoiler, lubricated, then fed through the fin press, where a die draws, details, punches collared holes, and cuts fins to a desired length and width. As the process for producing fins is well known to a routineer in the art, it is not discussed further herein. Fins (12) are stacked and staged for the lacing process as depicted by element (58) in FIG. 2.

As shown by step (52) in FIG. 2, the heat exchanger top and bottom end plates (14, 16) are manufactured in a stamping process that is independent of the fin stamping process (50). The end plates are typically made of a fairly stiff sheet metal. The end plates (14, 16) may also each include bends that form a channel or similar profile to provide strength and rigidity. Holes (20), which align with the collared holes (18) of the fins (12), are punched through the end plates by a press and die.

The hairpin tubes (22) are manufactured in process step (54). Hairpins are typically formed in a hairpin bender machine, such as a vertical bend hairpin bender manufactured by Burr Oak Tool, Inc. of Sturgis, Mich. Depending on the outer diameter of the stock tubing, commonly up to six lines of tubing are typically processed simultaneously in a single hairpin bender machine. As the process for bending hairpin tubes is well known to a routineer in the art, it is not discussed further herein.

In step (56), return bend fittings (24) are formed by a return bender machine or a return elbow bender machine such as those manufactured by Burr Oak Tool, Inc. of Sturgis, Mich. Return bender machines automatically bend and cut stock tubing to form the return bend fittings (24). As illustrated in FIGS. 3 and 4, the ends (25) of prior art return bend fittings (24) are cut square. Cross-over fittings are also manufactured as is known in the art. Details of these process steps are well known to routineers in the art and are thus not discussed further herein.

Referring back to step (58) of FIG. 2, the lacing process is that process in which the bottom end plate (16), stacks of fins (12), the top end plate (14), and the hairpins (22) are assembled together, typically by hand. Fins are stacked on a lacing table to form a contiguous slab of fins. The heat exchanger bottom end plate (16) is added to one end of the slab, and the end plate 14 is added to the other end of the slab. Hairpins (22) are typically hand-laced through the bottom end plate (16), the slab of fins (12), and the top end plate (14), one at a time by an operator who manually finesses them.

After lacing step (58), the heat exchanger assembly consists of stacks of fins (12) and a bottom end plate (16), which are loosely held together by hairpins (22) passing transversely through the assembly. In a corresponding manufacturing process for tube and fin heat exchangers that have copper hairpin tubes instead of aluminum hairpin tubes, the assembly would next be expanded within the hairpin expander in order to form tight metal-to-metal interfaces between the tubes and the fins of the heat exchanger. However, because of the abrasive nature of aluminum material, a processing oil is typically first injected into the interior of aluminum hairpins to lubricate the hairpin expansion bullets during hairpin expansion. Without a heavy layer of oil lubricant, the hairpin expander bullets tend to become galled with aluminum. Thus, as shown in step (60), an ordinary metal-working lubricant, for example, mineral oil, is injected into the hairpins (22).

As described with reference to step (62) of FIG. 2, the laced and oiled heat exchanger assembly is placed within a hairpin expander machine, such as a vertical hairpin expander available from Burr Oak Tool, Inc. of Sturgis, Mich. The top end plate (14) is slipped over the open ends (26) of the hairpins (22). The hairpin expander has bullets located at the ends of long rods for passing through the open ends of the hairpins. Multiple bullets and rods, two for each hairpin, are typically provided for simultaneously expanding all of the hairpins. Each bullet is sized to have an outer diameter larger than the inner diameter of the hairpin tubes. The expander has a hydraulic ram, that drives rods and presses the bullets into the hairpins, the bullets expanding the hairpins into a tight, interference-fit engagement with the fins (12). As shown in FIGS. 3 and 4, the hairpin expander also flares the ends (26) of hairpins (22) to create a socket (27) for receiving return bend fittings (24) or cross-over fittings.

The return bend fittings (24) are usually connected to the ends (26) of hairpins (22) by autobrazing, in which flux and filler metal (typically applied as a cladding) are prepositioned at the braze joints and the assembly is passed through an oven or furnace at a temperature that causes the filler metal to melt and flow to create a solid joint without any melting of the base metal. Brazing requires the joint surfaces to be particularly clean and free of non-metallic surface particulates. Therefore, after the expansion process, the assembly is typically washed in a hot aqueous solvent bath and/or flushed with an aqueous solvent to remove the lubricating oil that was applied for the expansion process (62). A typical aqueous washer, such as that available from Seco/Warwick Corp. of Meadville, Pa., is a multi-stage washing unit including automatic pre-wash, wash, rinse and dry chambers through which the heat exchangers are conveyed. The washer removes processing oils, dirt and aluminum fines from the heat exchanger assemblies. This aqueous washing/flushing process is costly, because the solvent becomes contaminated, requiring disposal in compliance with strict environmental regulations, and because a significant amount of energy is required to heat and maintain the solvent bath at elevated temperatures. Moreover, aqueous washers are high capital-cost items.

As an alternative to the aqueous washing cycle, a thermal degreasing oven may be used to vaporize light evaporative processing oils from the heat exchanger surfaces. Thermal degreasing ovens, such as those available from Seco/Warwick Corp. of Meadville, Pa., typically operate at 250-300° C. Heat exchangers are passed through the oven on a conveyor belt. The al degreasing ovens will only remove processing oils, not aluminum particulate.

After the cleaning process (64), the return bend fittings (24) and cross-over fittings are hand-assembled with prefluxed brazing rings to the open ends (26) of the hairpins (22) at step (66) of FIG. 2. Braze rings typically used in prior art processes are 88 percent aluminum and 12 percent silicon with Nocolok flux. Referring to FIGS. 3 and 4, the profile of the end of return bend fitting (24), which is out perpendicular to the axis of the tube, does not mirror the profile of the tapered part of the hairpin socket (27). On occasion, this profile mismatch can result in misassembly of the return bends and concomitant poor braze joints in socket (27).

FIG. 5 illustrates a section of a typical gas-fired open flame furnace (80) used for autobrazing copper return bends (24) to copper hairpins (22). The furnace (80) has two gas headers (82) from which burner assemblies (84, 86) extend. Heat exchanger assemblies pass longitudinally parallel to and midway between the gas headers (82) through the furnace (80) by way of a conveyor system (not shown). Each burner assembly terminates with an orifice (88) that is dimensioned to produce a narrow, sharp "pencil-point" flame. The burner assemblies (84, 86) are positioned to locate the flames and concentrate the heat directly at the braze joints as the heat exchanger assemblies pass by. For single or double row heat exchangers, only horizontal burners 84 are required to direct the flames at the return bend joints. When heat exchangers have 3 or 4 rows, such as shown in FIG. 5, angled burners 86 are required to direct the flame at inner return bend joints.

However, the open flame brazing furnace of FIG. 5 is not used to braze aluminum return bends to aluminum hairpins. Because aluminum is a highly reactive metal, it spontaneously oxidizes in the presence of the earth's atmosphere, forming a tenacious aluminum oxide layer that reduces wettability and inhibits the flow of the filler material at the braze joint. Therefore, autobrazing is performed in either a vacuum oven or a controlled-atmosphere oven. Non-corrosive fluxes such as Nocolok fluxes, which become sufficiently activated at the higher temperatures of the braze oven, are applied to strip the oxide layer to allow a wetted braze joint in the absence of oxygen.

Controlled atmospheric brazing (CAB) has superseded vacuum brazing as the preferred process for manufacturing tube and fin heat exchangers, because a CAB furnace, such as that available from Seco/Warwick Corp. of Meadville, Pa., is generally less expensive to purchase, requires less maintenance, and has a higher throughput than a vacuum furnace. A CAB process for use with aluminum heat exchangers is described in U.S. Pat. No. 5,771,962 issued to Evans, et al. or U.S. Pat. No. 6,512,205 issued to Evans. As depicted in step (68) of FIG. 2, the heat exchanger assembly is run through a CAB furnace, wherein the joints are brazed.

Although CAB is generally preferred over vacuum brazing, a CAB furnace is still an expensive piece of equipment, which requires regular maintenance, and which is characterized by a low throughput. For example, a typical CAB furnace may cost in excess of $4 million. It is desirable, therefore, to provide a process and system that results in a more efficient manufacturing of all aluminum tube and fin heat exchangers at lower cost by eliminating the need for controlled atmospheric brazing and for aqueous washing of tube and fin heat exchangers.

3. Identification of the Objects of the Invention

A primary object of this invention is to provide a manufacturing process that allows mechanically assembled aluminum tube and fin heat exchangers to be manufactured in an uncontrolled atmospheric brazing environment rather than in a controlled atmosphere brazing environment.

Another object of this invention is to provide pre-final expansion lubrication application that is compatible with open flame brazing for the use in the above aluminum tube manufacturing process.

Another object of this invention is to provide a pneumatic cleaning for the use in the process above aluminum tube manufacturing process.

Another object of the invention is to provide thermal cleaning application for use in the above aluminum tube manufacturing process.

Another object of the invention is to eliminate the need for aqueous washing of heat exchangers.

SUMMARY OF THE INVENTION

The objects above as well as the other features of the invention are realized in an improved method for manufacturing mechanically assembled aluminum tube and fin heat exchangers that, according to the preferred embodiment, includes a process for applying an ashless lubricant to the tube wall prior to the final expansion of the tube. The lubrication application reduces the amount of force required for final expansion and reduces the resultant distortion (rifling) to the internal tube geometry.

The manufacturing process according to the preferred embodiment also includes a pneumatic coil cleaning process. This pneumatic coil cleaning process removes the processing oil applied before the expansion process. This removal of the lubrication oil reduces the contamination imbedded in the internal tube geometry.

The manufacturing process according to the preferred embodiment also includes a thermal tube cleaning process. This thermal tube cleaning process removes the residual oil contamination imbedded in the tube geometry.

The manufacturing process according to the preferred embodiment also includes an uncontrolled atmospheric autobrazing step in which the return bends are brazed to the hairpin tubes. An uncontrolled atmospheric braze oven includes unique physical design elements of the braze torches relative to the orientation, elevation, horizontal spacing, and overall distance from the tube joint.

The manufacturing process further includes a swaging process to taper return bend fittings to improve the hairpin-return bend joint fit.

Finally, the invention includes heat exchangers with aluminum tube and fins manufactured according to the manufacturing process disclosed within.

BRIEF DESCRIPTION OF THE DRAWINGS

The invention is described in detail hereinafter on the basis of the embodiments represented in the accompanying figures, in which.

DESCRIPTION OF THE PREFERRED EMBODIMENT OF THE INVENTION

Figure 6:
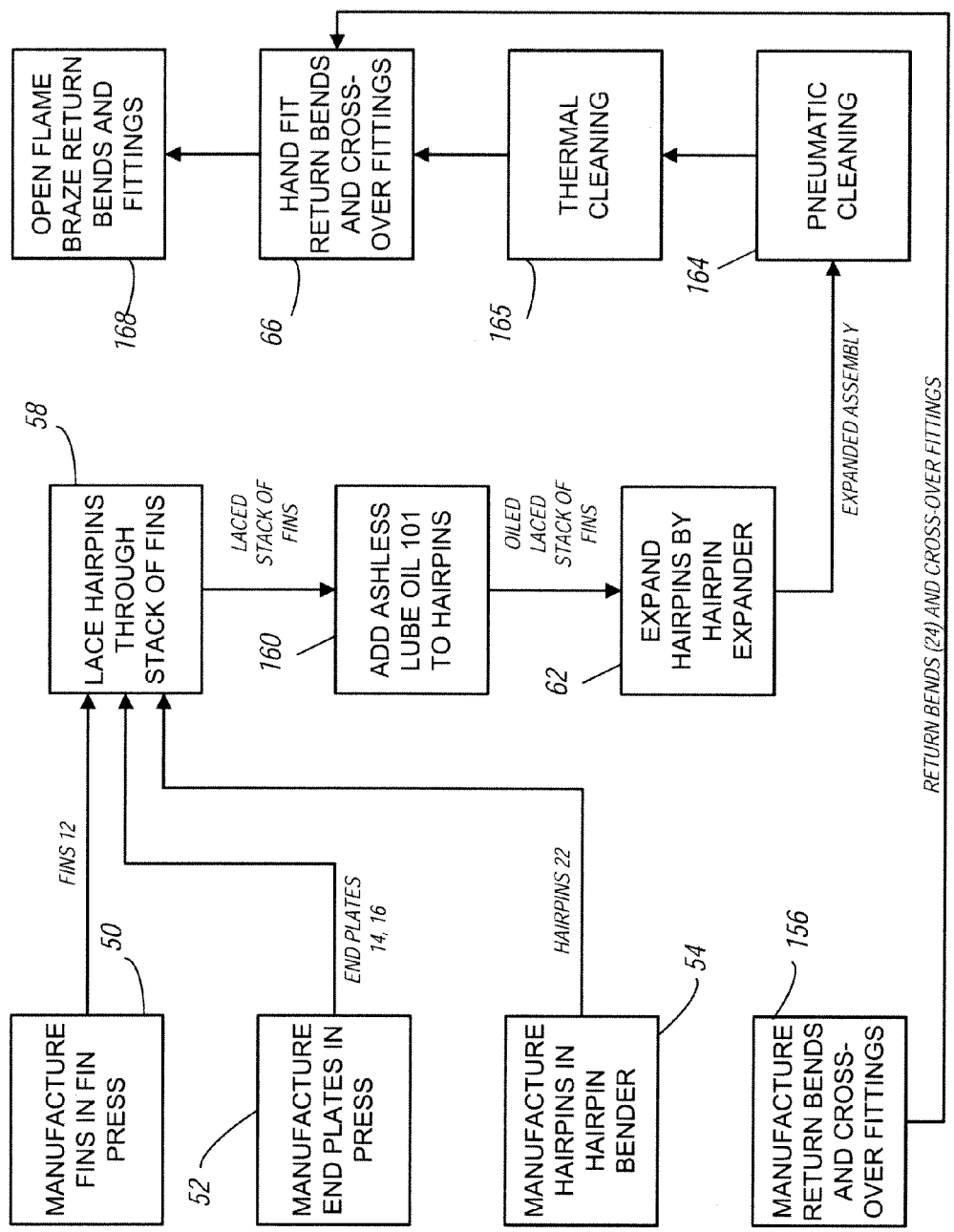
FIG. 6 is a flowchart diagram that describes the process for manufacturing aluminum heat exchangers according to the preferred embodiment of the invention.

FIG. 6 is a flowchart diagram that describes the process for manufacturing aluminum heat exchangers using an open flame, uncontrolled atmosphere brazing process according to the preferred embodiment of the invention.

The manufacturing of fins 12, end plates 14, 16, and hairpins 22 and the lacing of the hairpins through the bottom end pate and fins, as shown in steps 50, 52, 54 and 58, respectively, is the same as known in the prior art and described hereinabove with reference to FIG. 2.

Figure 7:
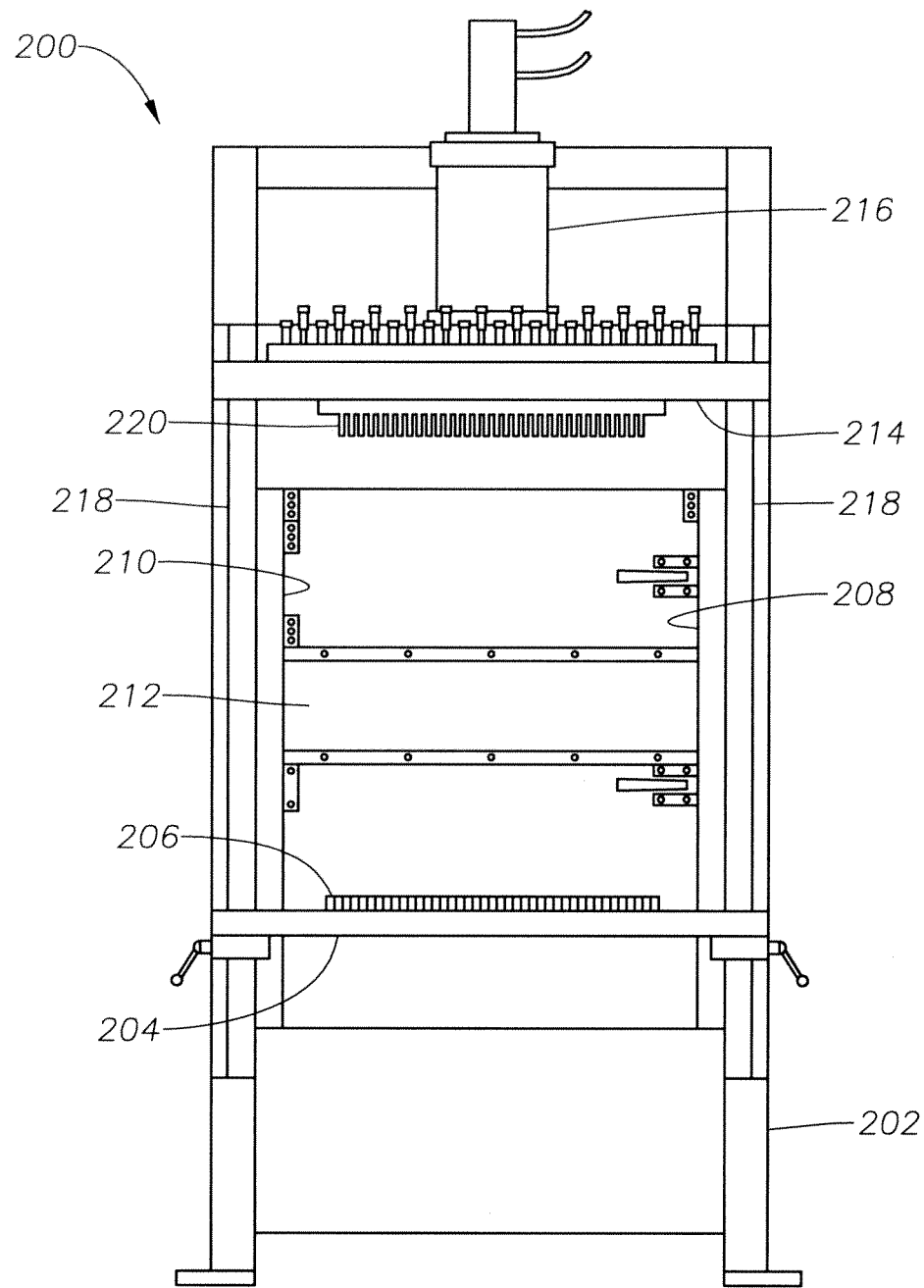
FIG. 7 is a front view of a hairpin oiler and pre-flare machine used in the process of FIG. 6 according to a preferred embodiment of the invention.
Figure 8:
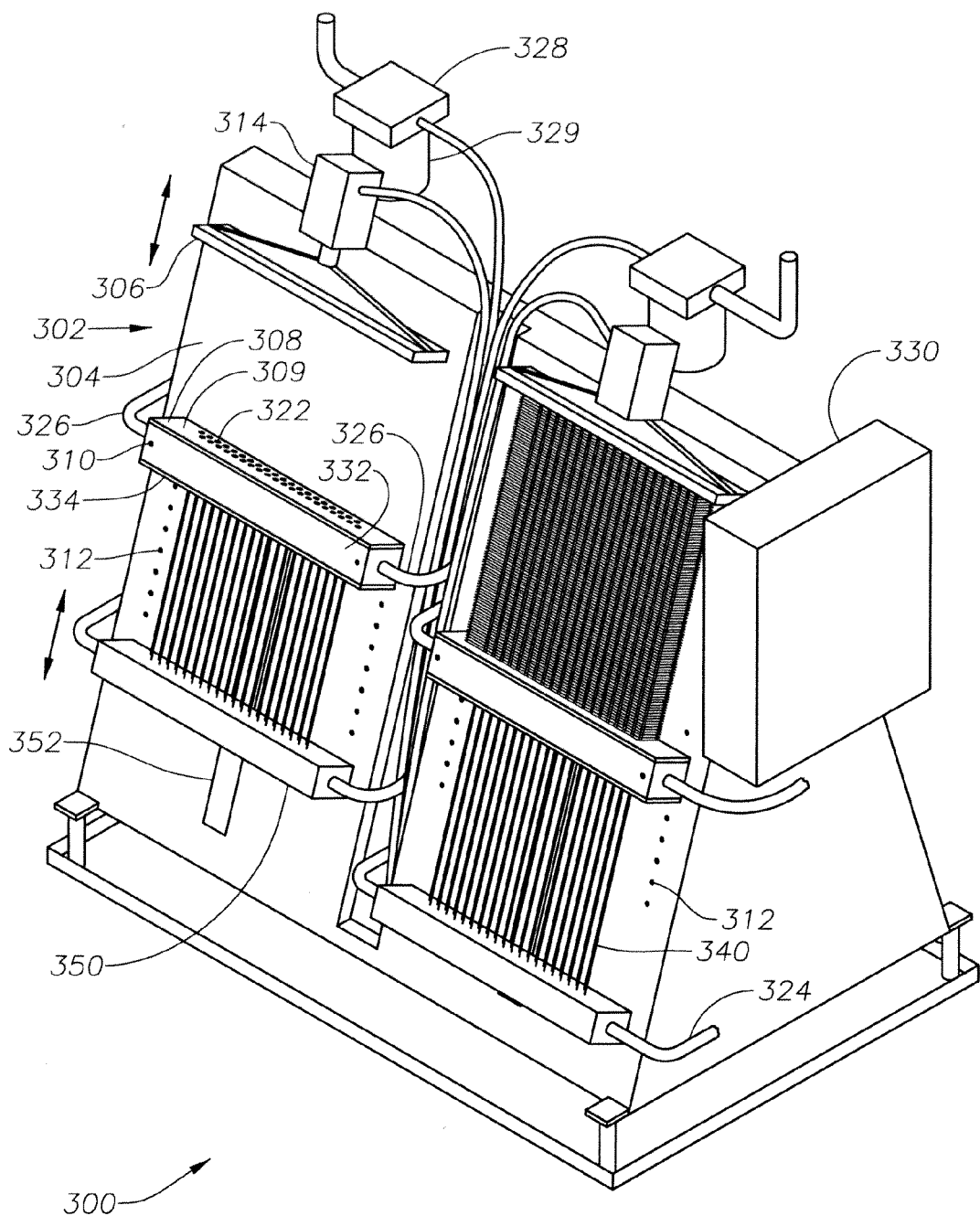
FIG. 8 is a perspective view of a pneumatic purge machine used in the process of FIG. 6 according to a preferred embodiment of the invention.
Figure 9:
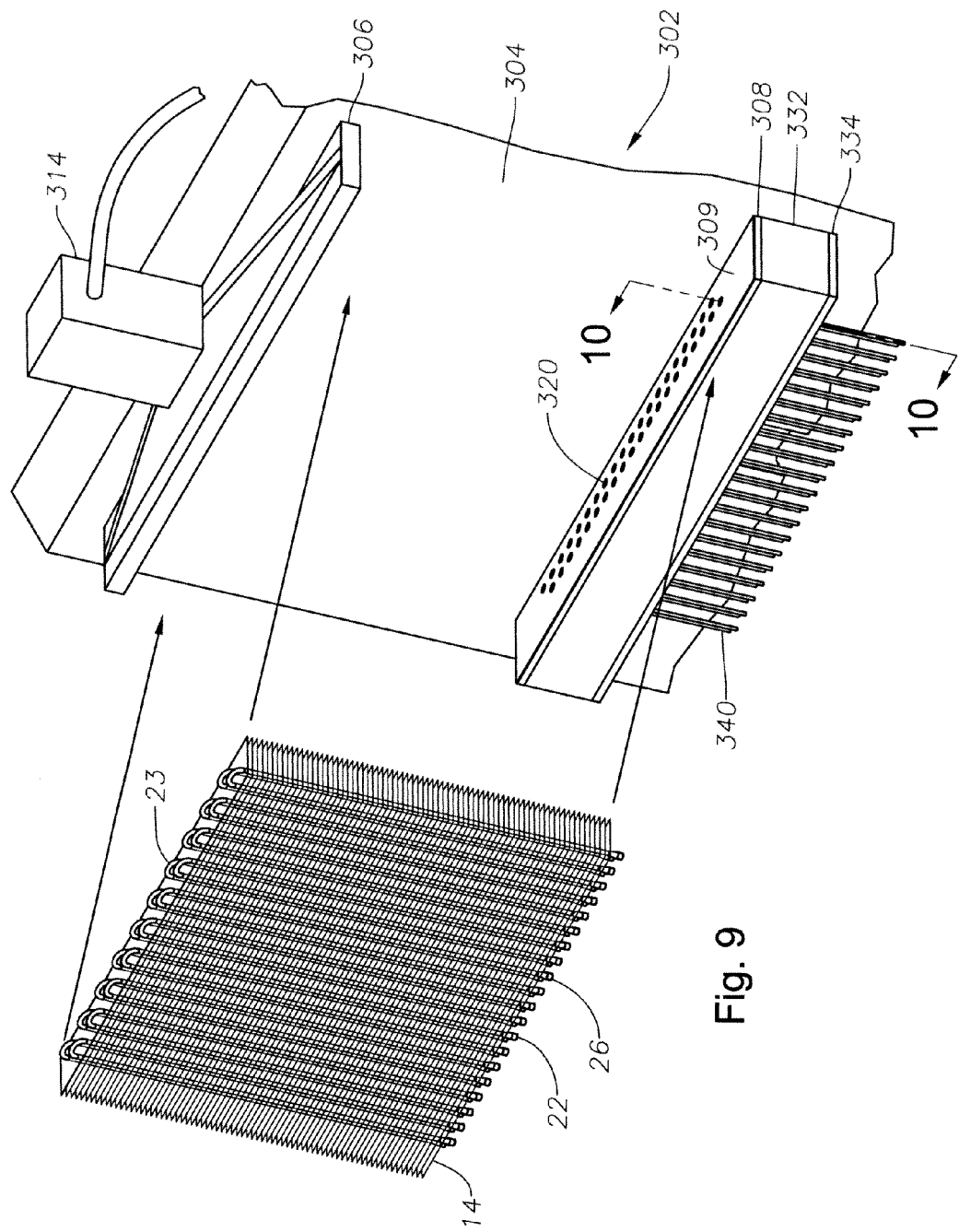
FIG. 9 is a detailed cutaway view of a portion of the pneumatic purge machine of FIG. 8.

Referring to step 160 of FIG. 6 and to FIG. 7, the laced aluminum heat exchanger assembly is placed into a hairpin pre-flare and lubrication machine 200 that is designed and arranged to inject lube oil 101 into hairpins 22. Unlike the processing oil typically used in the manufacturing process of prior art, oil 101 is an ashless, synthetic, metal-working lubricant that leaves no combustion residue. This clean-burning characteristic is an important factor for a successful thermal cleaning process 165. Oil 101 is also characterized by compatibility with brazing flux, with Freon refrigerants, and with aluminum.

Hairpin pre-flare and lubrication machine 200 resembles a hydraulic press, with a frame 202 and fixturing to receive and hold therein a laced heat exchanger assembly (not shown) oriented with the open ends 26 of hairpins 22 facing upwards. The fixturing includes a bottom plate 204 with a number of semi-circular cradles 206 pinned thereto, which support the bent ends of hairpins 22. The fixturing also includes side rails 208, 210 and a block plate 212 for laterally supporting the laced heat exchanger assembly. A block manifold 214 is carried by a hydraulic pan actuator 216 so that it moves vertically up and down, sliding along rails 218. Attached to manifold 214 are a number of tapered and hardened nozzles 220, which are arranged in a pattern to align with the open ends 26 of the hairpins 22 when the laced assembly is held in the fixture. The nozzles 220 and manifold 214 are connected to a supply of oil 101 (not illustrated).

Figure 1:
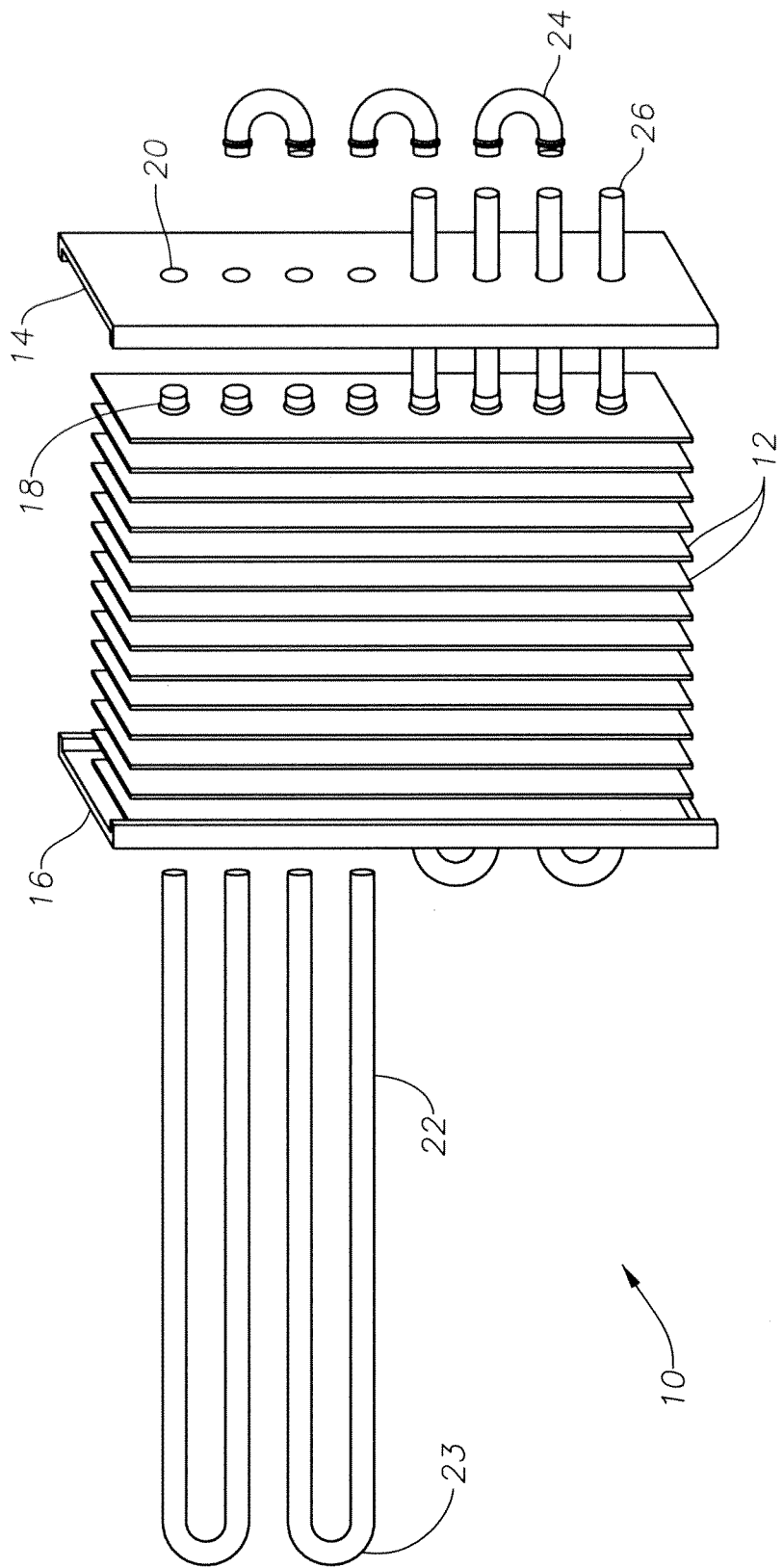
FIG. 1 is an exploded diagram of a typical tube and fin heat exchanger of prior art.
Figure 2:
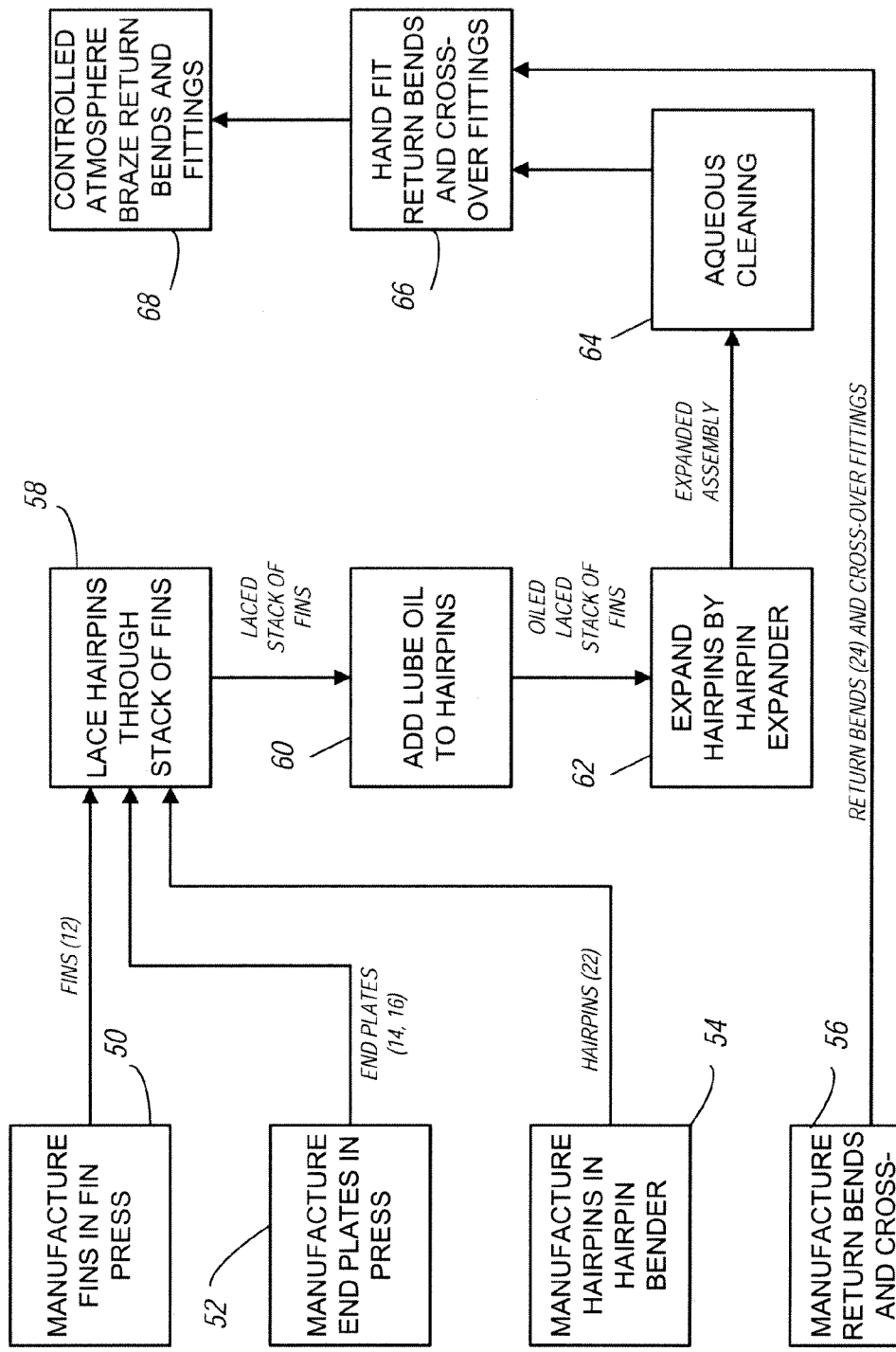
FIG. 2 is a flow chart diagram illustrating a typical prior art process for manufacturing aluminum tube and fin heat exchangers used for HVAC systems.
Figure 4:
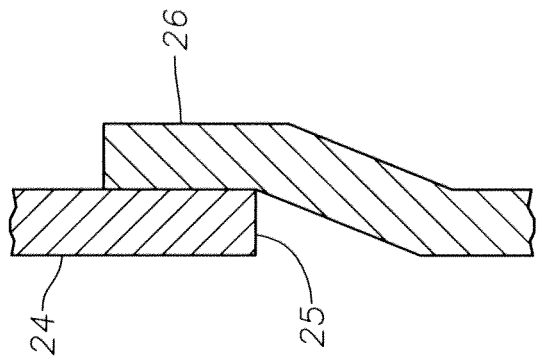
FIG. 4 is an enlarged cross-sectional view of the return bend/hairpin joint of FIG. 3.
Figure 3:
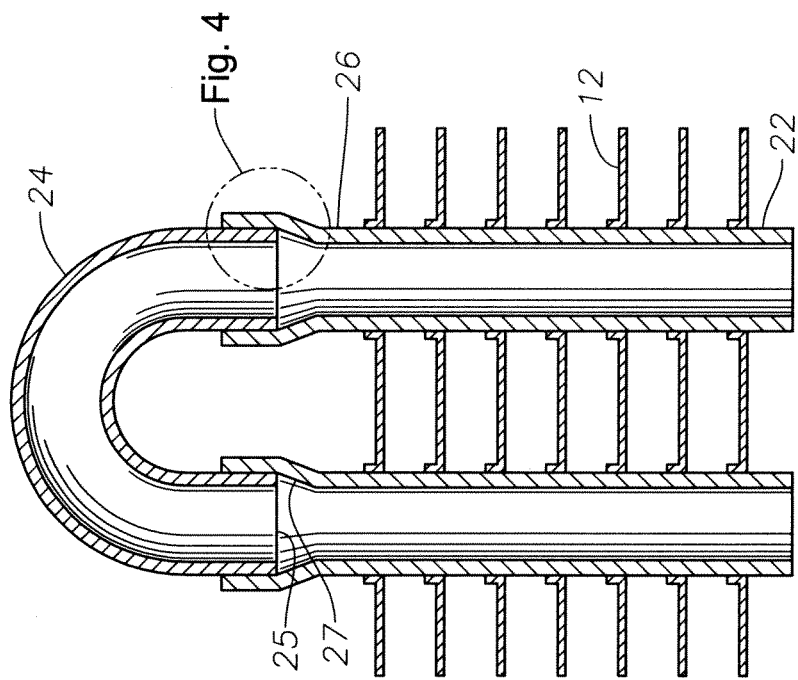
FIG. 3 is a cross-sectional view of a typical aluminum heat exchanger of prior art that shows the return bend/hairpin joint.

In operation, as represented by step 160 of FIG. 2, a laced heat exchanger assembly is placed on cradles 206 between rails 208, 210 and block plate 212. The assembly is held within this fixture while manifold 214 and nozzles 220 are driven downward by ram 216 until the nozzles 220 engage, and slightly flare, the open ends 26 of hairpins 22. A metered volume of oil 101 is injected by nozzles 220 into each hairpin tube. The nozzles 220 and manifold 214 are then driven upwards and the assembly is removed from the fixture. This process is repeated for the next heat exchanger assembly.

After pre-flare and lubrication, the hairpins are expanded into an interference fit engagement with the fins 12 and end plates 14, 16. The hairpin expansion step is the same as that known in prior art and as discussed hereinabove with reference to FIG. 2, and is thus not discussed in further detail here.

Braze joints must be clean for uncontaminated brazing. According to a preferred embodiment of the present invention, the aqueous cleaning process step 64 of prior art (FIG. 2) is replaced by a two-part cleaning process consisting of an initial pneumatic purge 164 and a subsequent thermal burn-off 165 of any residual oil 101.

Referring to FIGS. 6, and 8-10, in pneumatic cleaning step 164, the expanded heat exchanger assembly is placed in a fixture 302 of a pneumatic purge machine 300, and clean, dry, pressure-regulated air is blown through the hairpins 22. The oil-laden exhaust air and particulate is collected and passed through a separator 328 that strips the oil from the air stream and collects the oil into a reservoir 329. The exhaust air from separator 328 is then vented to the atmosphere. The collected processing oil 101 can be re-used again in step 160. The hairpins are purged until desired lubricant residual and surface particulate residual levels are reached. For increased throughput, pneumatic purge machine 300 ideally includes multiple fixtures 302, each capable of operating independently of the others.

According to a preferred embodiment, each fixture 302 includes a back plate 304, a clamping plate 306, and a manifold plate 308. Manifold plate 308 includes orifices 320 formed therethrough that are spaced to align with the open ends 26 of hairpins 22 for supplying the hairpins with a source of purge air and for collecting oil and oil-laden exhaust air. In operation, an expanded heat exchanger assembly is placed in fixture 302 on top of manifold plate 308 with the hairpins 22 aligned with orifices 320. Back plate 304 is ideally inclined, and the heat exchanger assembly leans against the back plate. Manifold plate 308 may have a compliant upper gasket surface 309. Hairpin open ends 26 sit directly atop manifold plate 308. Alternatively, hairpin open ends 26 may be received wholly within orifices 320, and the heat exchanger top endplate 14 may sit directly atop manifold plate 308.

Clamping plate 306 is movably connected to back plate 304 by an actuator 314, such as a hydraulic piston-cylinder arrangement. Clamping plate 306 is driven downwards by actuator 314 so that it contacts the hairpin bends 23 and clamps the heat exchanger against manifold plate 308. In this manner, a compressive sealing force is exerted between the open ends 26 of hairpins 22 and the orifices 320. Although not visible in FIGS. 8 and 9, clamping plate 306 may have grooves formed therein that cradle the hairpin bends 23 so as not to flatten them when applying the sealing force.

Manifold plate 308 is movably connected to back plate 304 by pins 310 that fit in holes 312 formed in back plate 304. In this manner, the height of manifold plate 308 may be quickly and easily adjusted to accommodate heat exchangers of various sizes. However, other suitable methods for adjusting the height of manifold plate 308 may be used.

In a first embodiment, for each U-shaped hairpin 22, one hairpin leg aligns with and is fluidly connected to an orifice 320 that supplies clean purge air. The other hairpin leg aligns with and is fluidly connected to an orifice 320 that collects particulate and oil-laden exhaust air. All of the supply orifices are connected to a source of clean dry air. Likewise, all of the collection orifices are connected to oil-air separator 328.

In a second embodiment, purge air is supplied via small diameter movable rods 340 that are passed into hairpins 22. The air supply rods 340 are fed into the hairpins 22 at the flared open ends 26 until the rods 340 near the hairpin bends 23. Clean, dry, pneumatic purge air is blown through the air supply rods 340 during one or both directions of rod travel. Each air supply rod 340 has a number of radial nozzles 342 for directing and impinging high velocity air against the interior surface of the hairpin tube to effectively remove particulate and oil residue.

In this latter embodiment, manifold plate 308 forms the top member of a collection manifold 332. The bottom member of collection manifold 332 has apertures 322 formed therethrough that align with orifices 320. The movable air supply rods 340 pass from below collection manifold 332, through apertures 322, and through orifices 320 in manifold plate 308 for cycling into and out of the hairpin tubes 22. The particulate and oil-laden air from hairpins 22 flows downwards around air supply tubes 340, through orifices 320 and into collection manifold 332. Apertures 322 are equipped with O-rings or bushings 336 that form dynamic seals against air supply rods 340 to prevent oil and exhaust air from caking through the bottom member 334 of collection manifold 332. Bushings 336 also help to ensure that rods 340 properly align with the open ends 26 of the heat exchanger. Collection manifold 332 is connected to oil-air separator 328 by hose 326.

Below collection manifold 332, the air supply rods 340 are attached to an air supply header 350. The air supply header 350 is connected to a source of clean, dry purge air via hose 324 for supplying rods 340. Air supply header 350 slides up and down back plate 304 along a track 352 for moving air supply rods 340 into the heat exchanger to a desired depth and back out again. A programmable actuator (not illustrated), such as a DC motor and lead screw arrangement, drives air supply header 350 up and down back plate 304 between user-specified set points at a user-specified velocity.

Figure 10:
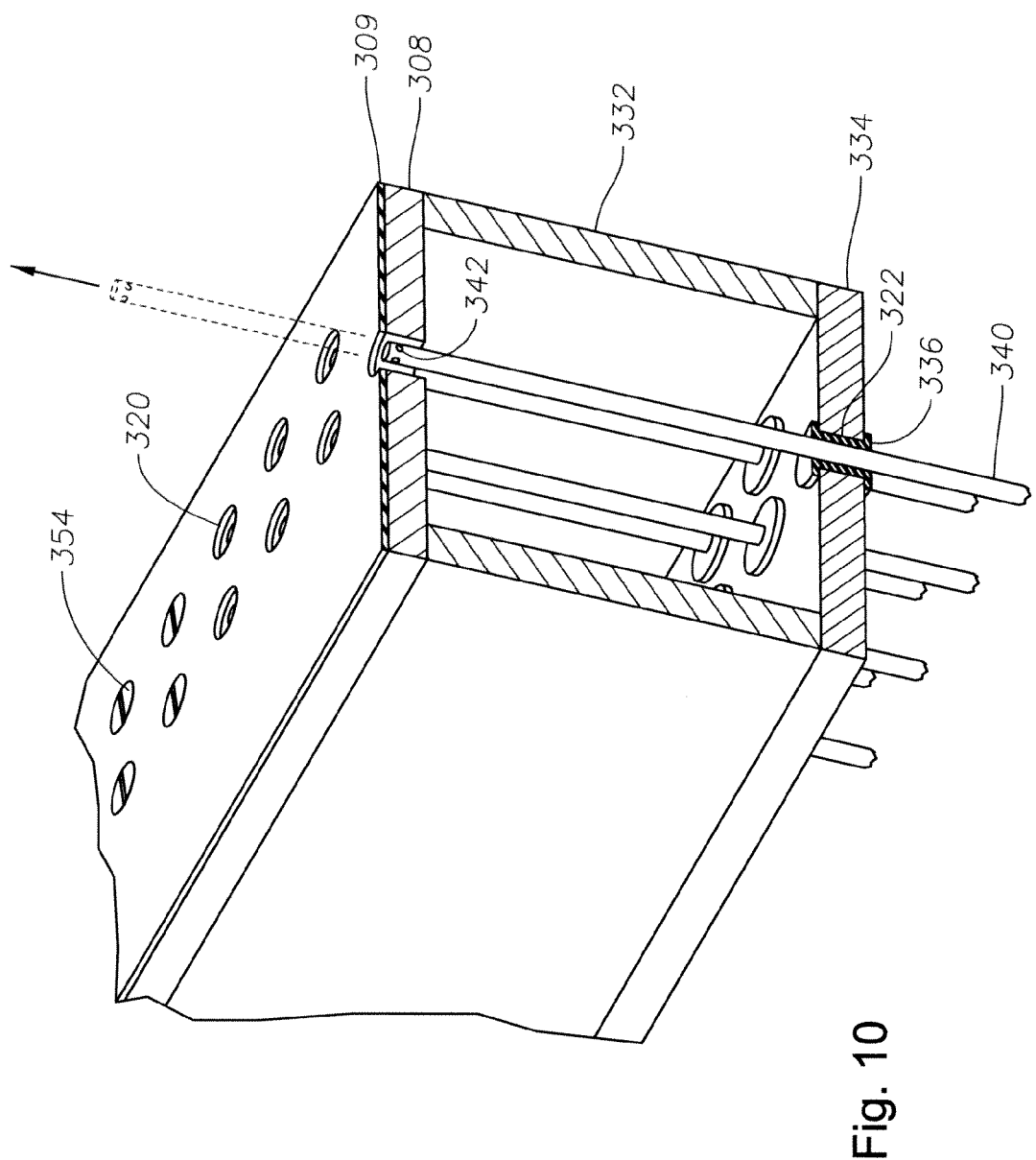
FIG. 10 is an enlarged cross-section taken along lines 10-10 of FIG. 9, showing the detail of the oil containment box of the pneumatic purge machine of FIG. 8.

To accommodate heat exchangers of various configurations, air supply rods 340 can be added to or removed from the air supply header 350 according to the footprint of the particular heat exchanger being cleaned. Preferably, air supply rods 340 are connected to air supply header 350 using quick connect fittings to accelerate the changes in configuration. Likewise, as shown in FIG. 10, plugs 354 are to be placed in any unused orifices 320 and apertures 322 to make certain that air and oil do not escape collection manifold 332.

Each heat exchanger configuration may have an optimal pneumatic air pressure and rod speed. Once a heat exchanger assembly has been purged for a programmable amount of time, the source of purge air is shut, air supply rods 340 are retracted (if used), and clamping plate 306 is raised, thus releasing the heat exchanger assembly from fixture 302. Pneumatic purge machine 300 preferably includes a control system 330 that can be used to cycle valves and actuators, adjust air pressures and set points for purge times, actuator travel distances, forces and speeds, and the like.

Referring back to FIG. 6, in step 165, heat exchangers are preferably passed through an open flame furnace or oven on a conveyor system. Unlike the thermal degreasing oven of prior art, according to a preferred embodiment of the invention, the thermal cleaning oven 401 (FIG. 12) is an open flame degreasing furnace that is situated adjacent to and shares a common conveyor system with an open flame brazing furnace. Oven 401 is similar to the open flame autobrazing oven 400 described hereunder, except that the thermal cleaning oven may be maintained at a lower temperature. The elevated temperatures causes the residual of oil 101 to burn off. Because oil 101 is ashless, its combustion is clean. The duration of time in which the braze joint regions of the heat exchanger is subjected to cleaning temperatures is controlled to produce a residual level that is sufficiently low to enable a successful uncontrolled atmosphere autobrazing process 68.

Figure 11:
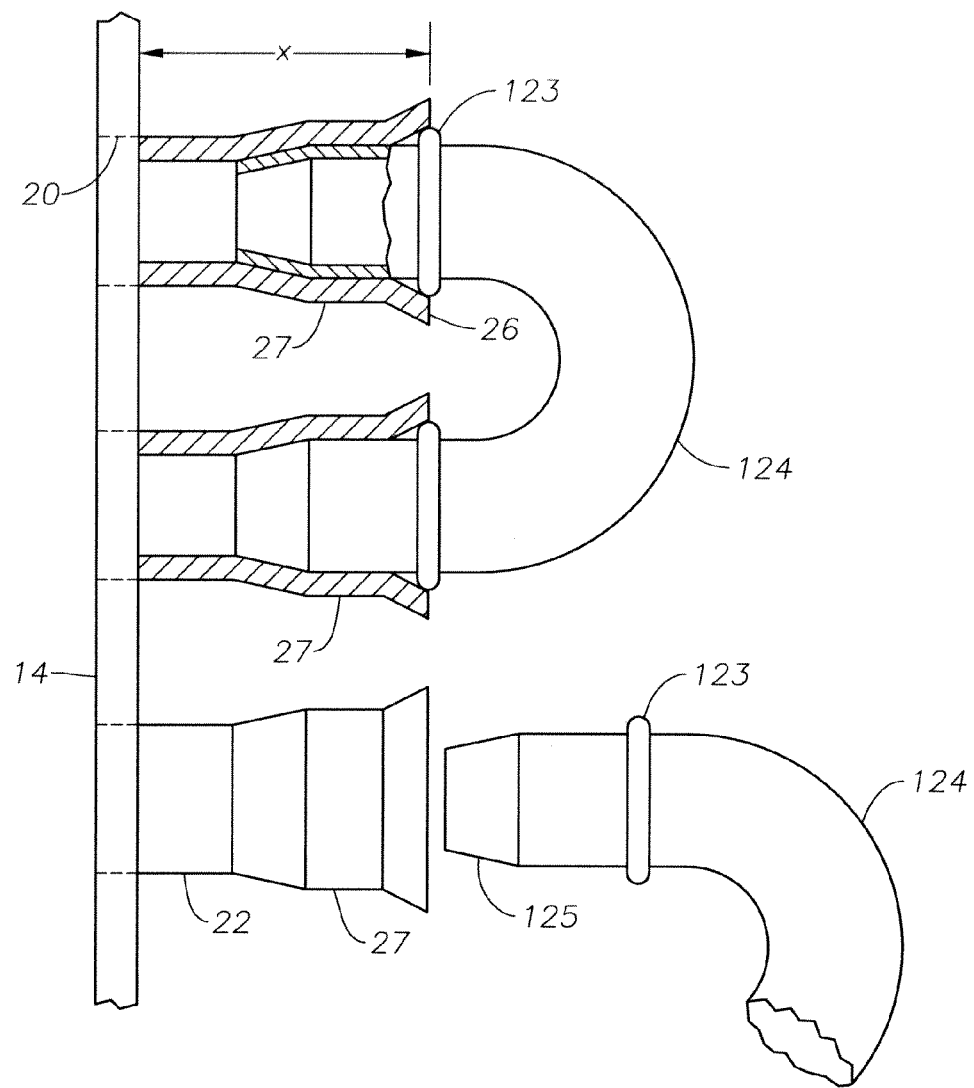
FIG. 11 is a detailed side view in partial cross-section illustrating the return bend/hairpin joint according to a preferred embodiment of the invention.

Referring to FIGS. 6 and 11, at step 156 return bend fittings 124 are manufactured in a process similar to prior art process step 56 of FIG. 2 that is used to manufacture return bends 24, except that after the tubes are bent and cut, the return bend fitting ends 125 are swaged or otherwise formed into a taper that matches the profile of socket 27. The matching taper of return bend fitting ends 125 allows the operator on the assembly line to more readily determine if the return bend fitting is not properly seated within sockets 27, thus reducing bad brazed connections.

At step 66, the return bends 124 and crossover fittings are hand-assembled with autobraze rings 123 to the open sockets 27 of hairpins 22. The assembly may first be passed through a cooling chamber to lower the heat exchanger temperature that had been elevated in the thermal cleaning oven in order to reduce the risk of burns to personnel. Although various brazing materials and fluxes may be used, according to a preferred embodiment of the invention, braze rings 123 of 78 percent zinc and 22 percent aluminum with a cesium flux is used. These braze rings 123 are characterized by a melting point of about 900° F. As aluminum melts at about 1160° F., the preferred braze rings 123 allow brazing at a lower temperature and with a greater temperature safety margin than the more commonly used 88 percent aluminum 12 percent silicon Nocolok-core braze rings (which melt at about 1070° F.). The 22-78 braze rings are a contributing factor to a successful open flame autobrazing process 168, described herein.

FIG. 11 also illustrates the stickup distance $\chi$, which is the length the hairpins ends 26 extend beyond top end plate 14. In heat exchangers 10 of prior art, the stickup distance $\chi$ is typically ½ inch. According to the preferred embodiment of the invention, the stickup distance is increased to at least approximately ⅝ inch and more preferably ¾ inch. This dimensional change is instrumental in enabling an open flame brazing process for aluminum hairpins/return bend fittings as described below.

Figure 12:
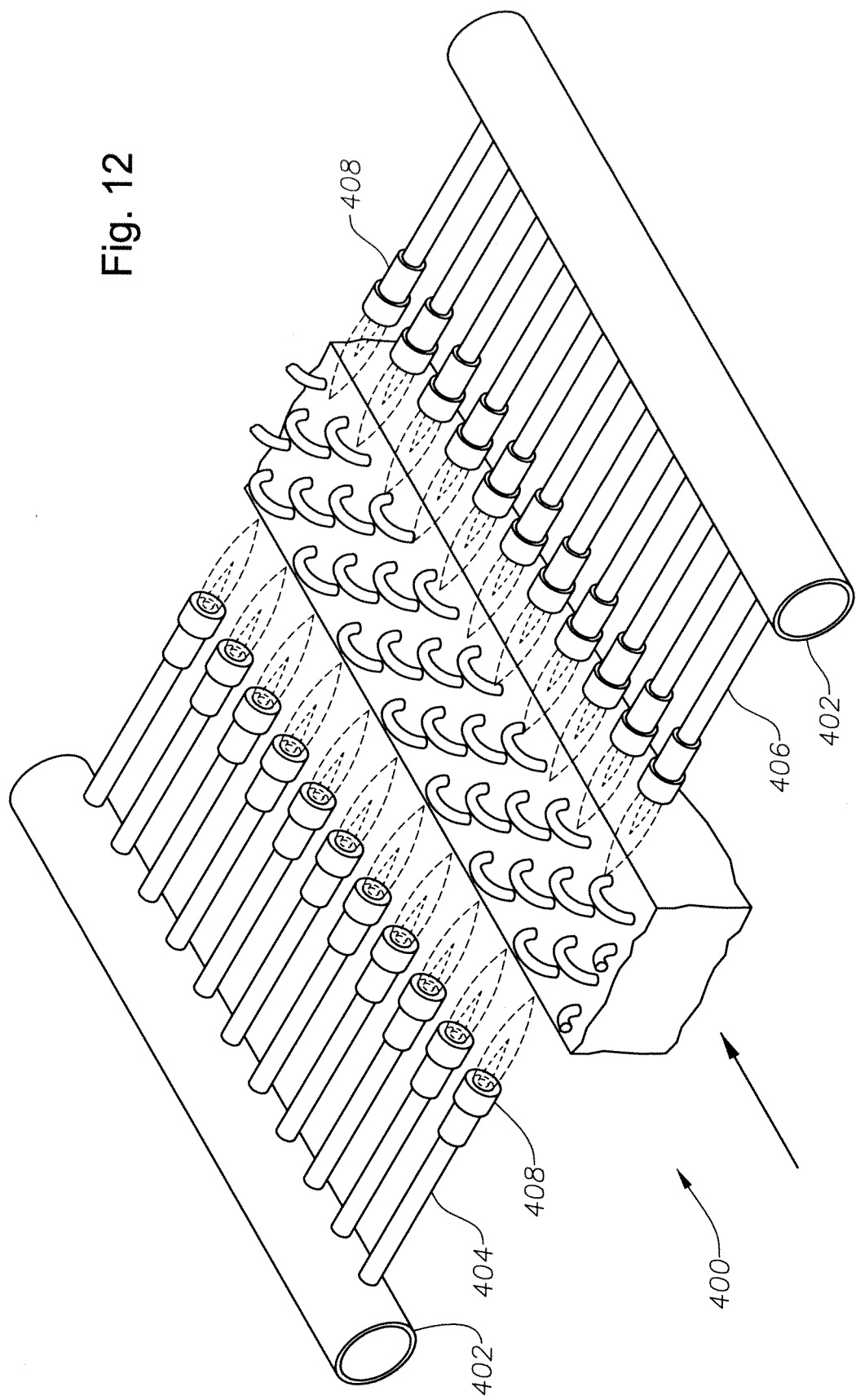
FIG. 12 is a perspective view of an open flame braze oven for brazing aluminum hairpins to aluminum return bend and cross-over fittings according to a preferred embodiment of the invention showing a dispersed cloud flame diverted below the return bend/hairpin joints to be brazed.

FIG. 12 illustrates the open flame oven 400 for autobrazing according to the preferred embodiment of the invention. Oven 400 includes two gas headers 402 and first and second horizontal rows of burners 404, 406. Because of the diffuse cloud-like flames, angled burners are not required to braze heat exchangers having three or four rows of hairpins. The heat exchanger assemblies pass between burner rows 404 and 406 on a conveyor (not shown). Cloud burner tips 402 are provided to produce a diffuse flame, which are known in the prior art.

Figure 5:
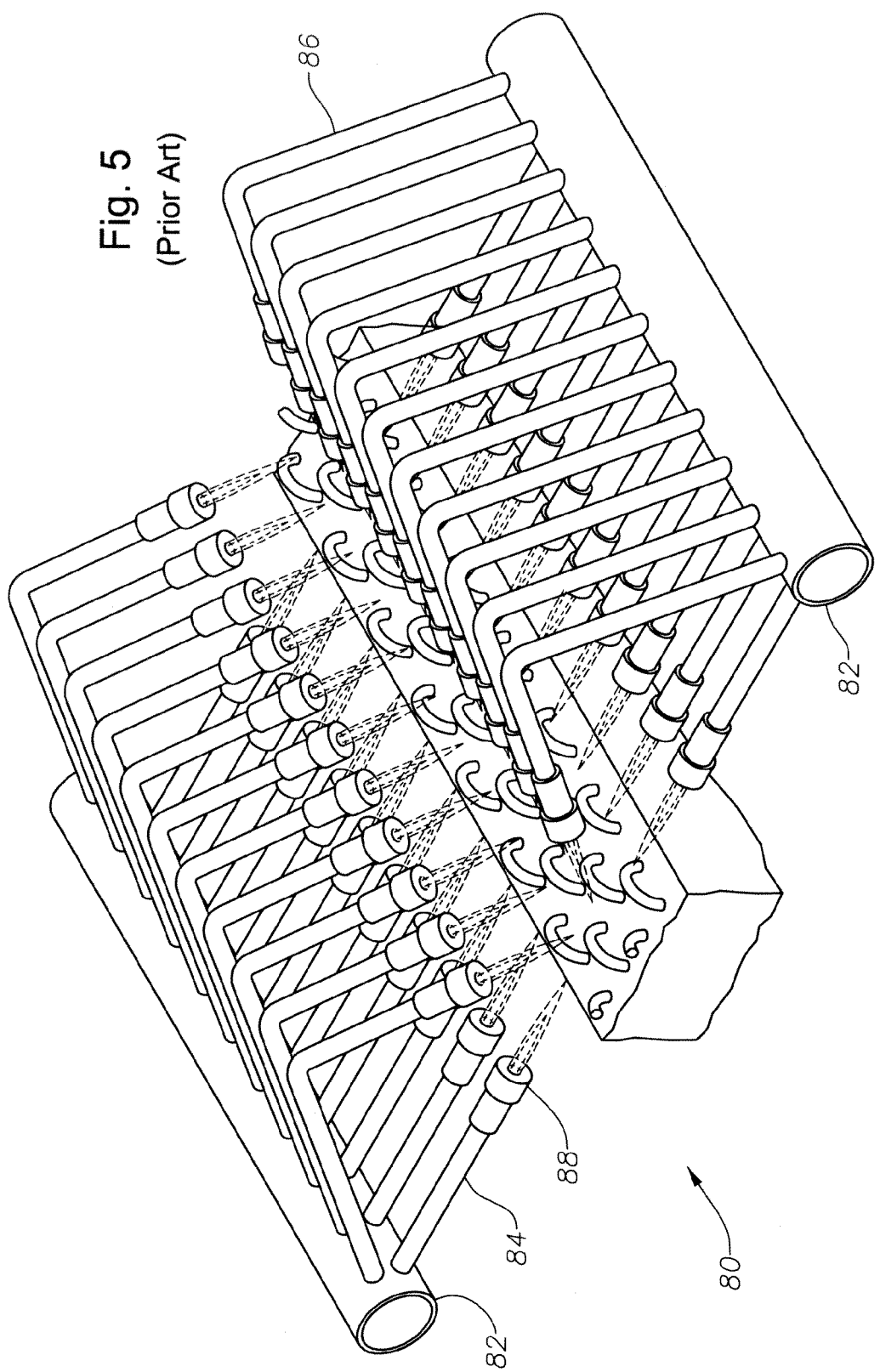
FIG. 5 is a perspective view of a braze oven of prior art used in open flame (uncontrolled atmosphere) brazing of copper hairpins/return bend joints, showing pencil-point flame burns directed at the return bend/hairpin braze joins to concentrate heat there.

In the open flame brazing process 168 (FIG. 6), diffuse flames are directed below the hairpin socket-return bend fitting joint (as opposed to pinpoint flames directed at the joint as known in prior art open flame brazing of copper tubing shown in FIG. 5). Direct pencil point flames may result in hairpin leaks being formed in the aluminum tubing. Thus, it is important that the stickup distance is greater to enable a diffuse flame to be positioned below the braze joint.

Figure 13:
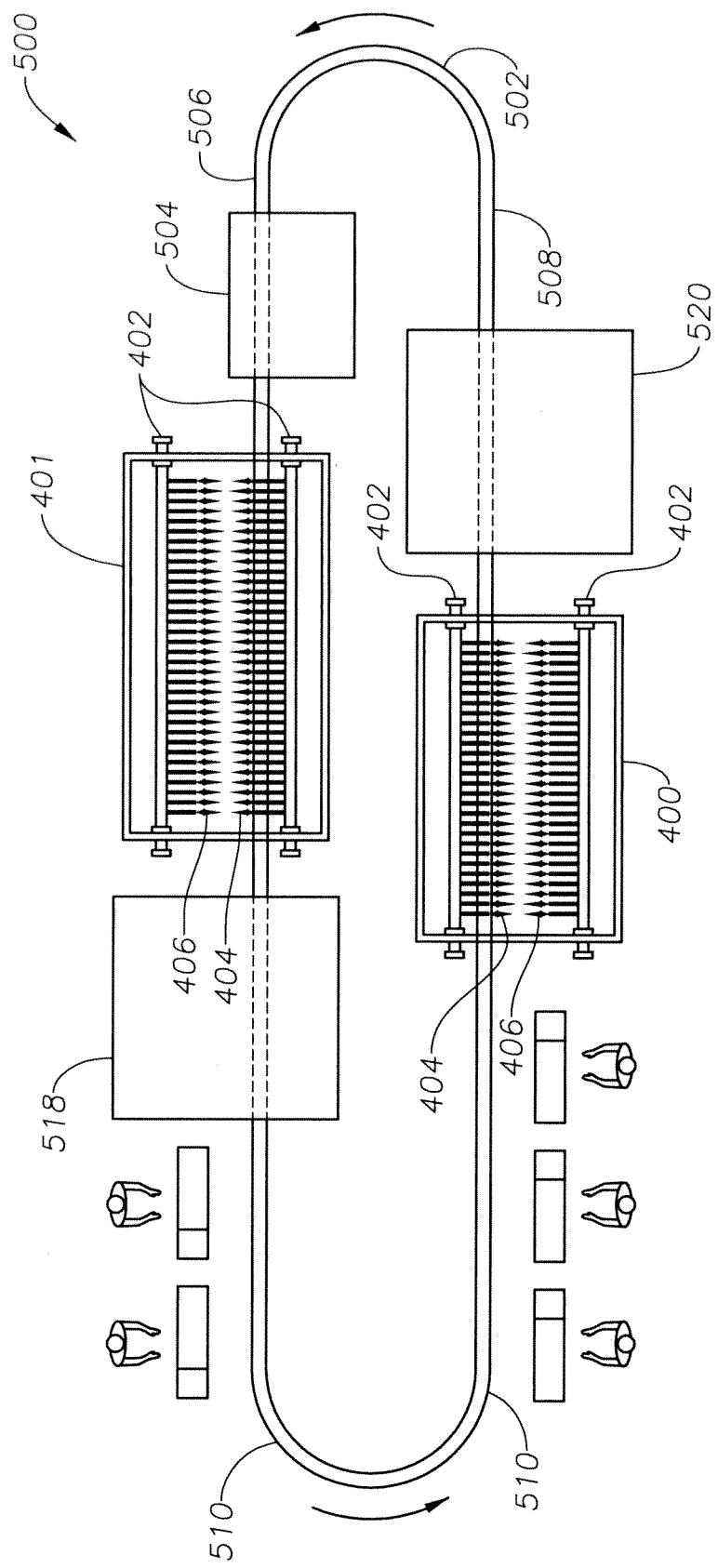
FIG. 13 is a top view of a heat exchanger manufacturing line according to a preferred embodiment of the invention that includes thermal cleaning final assembly and brazing stations along a common conveyor for a solvent manufacturing process.

FIG. 13 illustrates atop view of a thermal cleaning, return bend fitting installation, and open-flame autobrazing manufacturing 500 line according to a preferred embodiment of the invention. Station 500 includes a conveyor system 502 that forms a horizontal loop. Conveyor system is driven by a drive mechanism 504. Conveyor system 502 is arranged to transport heat exchanger assemblies through the line 500 about the loop. Expanded and pneumatically cleaned heat exchanger assemblies are loaded on to conveyor at loading station 506, and fully assembled and brazed heat exchangers are offloaded at station 508.

After the pneumatically cleaned heat exchanger assemblies are loaded at station 506, they are transported by conveyor 502 through a thermal cleaning oven 401. Oven 401 has the same general design and configuration as open-flame brazing oven 400 of FIG. 12, except for perhaps the oven size and the number and spacing of burners 404, 406. For example, as illustrated in FIG. 13, thermal cleaning oven 401 may have a greater number of burners than brazing oven 400. If the same mass flow rate of gas is fed through gas mains 402 in both thermal cleaning oven 401 and brazing oven 400, because the same mass flow rate of gas would be consumed by more burners in a larger volume in thermal cleaning oven 401 than in brazing oven 400, the resultant temperature in thermal cleaning oven 401 would be lower than brazing oven 400.

After degreasing 165 in thermal cleaning oven 401, heat exchangers are passed through a cooling chamber 518 that cools down the assemblies so that return bends fittings and braze rings can be hand-fitted in the hairpin sockets at an assembly station 510.

The assembled heat exchangers are then transported by conveyor 502 through open flame brazing oven 400, in which the aluminum autobrazing process 168 occurs. After autobrazing, the heat exchangers are cooled in cooling chamber 520 so that they can be handled by operators, who remove them from conveyor 502 at station 508.

The Abstract of the disclosure is written solely for providing the United States Patent and Trademark Office and the public at large with a way by which to determine quickly from a cursory reading the nature and gist of the technical disclosure, and it represents solely a preferred embodiment and is not indicative of the nature of the invention as a whole.

While some embodiments of the invention have been illustrated in detail, the invention is not limited to the embodiments shown; modifications and adaptations of the above embodiment may occur to those skilled in the art. Such modifications and adaptations are in the spirit and scope of the invention as set forth herein:

What is claimed is:

1. An apparatus (300) for passing a purging fluid through a plurality of tubes of a heat exchanger, the apparatus comprising:
   a plate (308) having a plurality of orifices (320) formed therethrough so as to align with ends of said plurality of tubes of said heat exchanger;
   a fixture (302) arranged for clamping said heat exchanger against said plate;
   a plurality of hollow rods (340) disposed at said orifices, each of said rods including an opening thereon and arranged so as to be coaxially movable within an associated one of said plurality of tubes;
   a collection manifold (332) coupled to said plate (308) for collecting an effluent of said purging fluid; and
   a plurality of apertures (322) formed in said collection manifold (332) so as to align with said plurality of orifices (320) and said ends of said plurality of tubes whereby said plurality of rods (340) pass through said plurality of apertures;
   whereby a purging fluid is passed through said plurality of rods into said plurality of tubes.

2. The apparatus of claim 1, further comprising a bottom member (334) of said collection manifold (332) in which said plurality of apertures (322) are formed.

3. The apparatus of claim 2, further comprising bushings (336) disposed within said plurality of apertures (322) for forming seals against said plurality of rods (340).

4. The apparatus of claim 1, said fixture (302) further comprising a back plate (304) and a clamping plate (306).

5. The apparatus of claim 4, wherein said back plate (304) is inclined.

6. The apparatus of claim 1 further comprising:
   an actuator (314) coupled to said fixture and arranged so as to force said heat exchanger against said plate (308) thereby sealing the ends of said plurality of tubes against said plate.

7. The apparatus of claim 1 wherein:
said collection manifold (332) is disposed against said plate (308) opposite of said heat exchanger.

8. The apparatus of claim 1 wherein:
said purging fluid is air.

9. The apparatus of claim 1, further comprising an air supply header (350) for supplying purging fluid to said plurality of rods (340).

10. The apparatus of claim 1, wherein said plate (308) further comprises a gasket surface (309).

11. The apparatus of claim 1, further comprising one or more plugs (354) disposed in any of said plurality of orifices (320) and said plurality of apertures (322) not having said plurality of rods (340) passing therethrough.

12. The apparatus of claim 1, further comprising a control system (330).

* * * * *